United States Patent
Roberts et al.

(10) Patent No.: US 7,680,902 B2
(45) Date of Patent: *Mar. 16, 2010

(54) METHOD AND SYSTEM FOR ACCESSING WEB PAGES BASED ON PLAYBACK OF RECORDINGS

(75) Inventors: Dale Tyson Roberts, Sausalito, CA (US); Ann E. Greenberg, San Anselmo, CA (US)

(73) Assignee: Gracenote, Inc., Emeryville, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 11/841,784

(22) Filed: Aug. 20, 2007

(65) Prior Publication Data

US 2008/0040492 A1 Feb. 14, 2008

Related U.S. Application Data

(60) Continuation of application No. 09/820,722, filed on Mar. 30, 2001, now Pat. No. 7,308,485, which is a continuation of application No. 09/354,166, filed on Jul. 16, 1999, now Pat. No. 6,230,192, which is a division of application No. 08/838,082, filed on Apr. 15, 1997, now Pat. No. 5,987,525, and a division of application No. 09/060,876, filed on Apr. 15, 1998, now Pat. No. 6,154,773.

(51) Int. Cl.
*G06F 13/00* (2006.01)
(52) U.S. Cl. .................. 709/219; 709/227; 709/250
(58) Field of Classification Search ................ 709/217, 709/219, 227, 228, 250
See application file for complete search history.

(56) References Cited

U.S. PATENT DOCUMENTS

| 4,488,179 A | 12/1984 | Kruger et al. |
| 4,599,644 A | 7/1986 | Fischer |
| 4,641,205 A | 2/1987 | Beyers |
| 4,646,145 A | 2/1987 | Percy et al. |
| 4,675,757 A | 6/1987 | Block |
| 4,870,568 A | 9/1989 | Kahle et al. |

(Continued)

FOREIGN PATENT DOCUMENTS

EP 0194143 A2 9/1986

(Continued)

OTHER PUBLICATIONS

Proposal No: 96-1—Changes to Field 856 (*Electronic Location and Access*) in the USMARC Formats, http://www.loc.gov/marc/marbi/1996/96-01.html, Source: Library of Congress, (Dec. 1, 1995), 12 pgs.

(Continued)

*Primary Examiner*—Viet Vu
(74) *Attorney, Agent, or Firm*—Schwegman Lundberg & Woessner, P.A.

(57) ABSTRACT

Entertainment content complementary to a musical recording is delivered to a user's computer by a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

22 Claims, 3 Drawing Sheets

U.S. PATENT DOCUMENTS

| | | | |
|---|---|---|---|
| 5,113,383 A | 5/1992 | Amemiya et al. |
| 5,132,949 A | 7/1992 | Choi |
| 5,157,614 A | 10/1992 | Kashiwazaki et al. |
| 5,157,646 A | 10/1992 | Amemiya et al. |
| 5,206,949 A | 4/1993 | Cochran et al. |
| 5,210,734 A | 5/1993 | Sakurai |
| 5,237,157 A | 8/1993 | Kaplan |
| 5,263,010 A | 11/1993 | Amemiya et al. |
| 5,341,350 A | 8/1994 | Frank et al. |
| 5,388,259 A | 2/1995 | Fleischman et al. |
| 5,392,264 A | 2/1995 | Hira |
| 5,404,393 A | 4/1995 | Remillard |
| 5,410,543 A | 4/1995 | Seitz et al. |
| 5,414,684 A | 5/1995 | Nonaka et al. |
| 5,430,698 A | 7/1995 | Nonaka et al. |
| 5,446,714 A | 8/1995 | Yoshio et al. |
| 5,446,891 A | 8/1995 | Kaplan et al. |
| 5,450,597 A | 9/1995 | Klappert et al. |
| 5,463,605 A | 10/1995 | Nishida et al. |
| 5,464,946 A | 11/1995 | Lewis |
| 5,465,240 A | 11/1995 | Mankovitz |
| 5,471,576 A | 11/1995 | Yee |
| 5,475,835 A | 12/1995 | Hickey |
| 5,488,725 A | 1/1996 | Turtle et al. |
| 5,544,139 A | 8/1996 | Aramaki et al. |
| 5,559,764 A | 9/1996 | Chen et al. |
| 5,559,949 A | 9/1996 | Reimber et al. |
| 5,583,560 A | 12/1996 | Florin et al. |
| 5,584,025 A | 12/1996 | Keithley et al. |
| 5,615,345 A | 3/1997 | Wanger |
| 5,625,608 A | 4/1997 | Grewe et al. |
| 5,642,337 A | 6/1997 | Oskay et al. |
| 5,649,114 A | 7/1997 | Deaton et al. |
| 5,659,732 A | 8/1997 | Kirsch |
| 5,673,322 A | 9/1997 | Pepe et al. |
| 5,679,911 A | 10/1997 | Moriyama et al. |
| 5,680,379 A | 10/1997 | Ishida et al. |
| 5,689,484 A | 11/1997 | Hirasawa |
| 5,691,964 A | 11/1997 | Niederlein et al. |
| 5,694,162 A | 12/1997 | Freeny, Jr. |
| 5,694,546 A | 12/1997 | Reisman |
| 5,701,385 A | 12/1997 | Katsuyama et al. |
| 5,703,795 A | 12/1997 | Mankovitz |
| 5,710,884 A | 1/1998 | Dedrick |
| 5,721,827 A | 2/1998 | Logan et al. |
| 5,726,957 A | 3/1998 | Hisamatsu et al. |
| 5,727,129 A | 3/1998 | Barrett et al. |
| 5,740,304 A | 4/1998 | Katsuyama et al. |
| 5,740,549 A | 4/1998 | Reilly et al. |
| 5,745,681 A | 4/1998 | Levine et al. |
| 5,751,672 A | 5/1998 | Yankowski |
| 5,751,956 A | 5/1998 | Kirsch |
| 5,754,784 A | 5/1998 | Garland et al. |
| 5,757,739 A | 5/1998 | Heath et al. |
| 5,761,606 A | 6/1998 | Wolzien |
| 5,761,649 A | 6/1998 | Hill |
| 5,761,736 A | 6/1998 | Sharma et al. |
| 5,768,222 A | 6/1998 | Hisamatsu et al. |
| 5,774,431 A | 6/1998 | Bos et al. |
| 5,774,664 A | 6/1998 | Hidary et al. |
| 5,774,666 A | 6/1998 | Portuesi |
| 5,778,181 A | 7/1998 | Hidary et al. |
| 5,778,187 A | 7/1998 | Monteiro et al. |
| 5,781,889 A | 7/1998 | Martin et al. |
| 5,781,897 A | 7/1998 | Chen et al. |
| 5,781,909 A | 7/1998 | Logan et al. |
| 5,782,692 A | 7/1998 | Stelovsky |
| 5,793,726 A | 8/1998 | Nagano |
| 5,793,980 A | 8/1998 | Glaser et al. |
| 5,796,393 A | 8/1998 | MacNaughton et al. |
| 5,796,945 A | 8/1998 | Tarabella |
| 5,796,948 A | 8/1998 | Cohen |
| 5,796,952 A | 8/1998 | Davis et al. |
| 5,801,689 A | 9/1998 | Huntsman |
| 5,809,250 A | 9/1998 | Kisor |
| 5,809,512 A | 9/1998 | Kato |
| 5,815,471 A | 9/1998 | Mince et al. |
| 5,822,216 A | 10/1998 | Satchell, Jr. et al. |
| 5,822,283 A | 10/1998 | Bos et al. |
| 5,822,436 A | 10/1998 | Rhoads |
| 5,826,267 A | 10/1998 | McMillan |
| 5,835,914 A | 11/1998 | Brim |
| 5,838,910 A | 11/1998 | Domenikos et al. |
| 5,848,427 A | 12/1998 | Hyodo |
| 5,893,910 A | 4/1999 | Martineau et al. |
| 5,894,554 A | 4/1999 | Lowery et al. |
| 5,903,816 A | 5/1999 | Broadwin et al. |
| 5,905,248 A | 5/1999 | Russell |
| 5,905,865 A | 5/1999 | Palmer et al. |
| 5,915,091 A | 6/1999 | Ludwig et al. |
| 5,915,288 A | 6/1999 | Gabriel |
| 5,918,223 A | 6/1999 | Blum et al. |
| 5,929,849 A | 7/1999 | Kikinis |
| 5,949,411 A | 9/1999 | Doerr et al. |
| 5,950,173 A | 9/1999 | Perkowski |
| 5,953,005 A | 9/1999 | Liu |
| 5,956,716 A | 9/1999 | Kenner et al. |
| 5,959,944 A | 9/1999 | Dockes et al. |
| 5,959,945 A | 9/1999 | Kleiman |
| 5,963,916 A | 10/1999 | Kaplan |
| 5,987,454 A | 11/1999 | Hobbs |
| 5,987,525 A | 11/1999 | Roberts et al. |
| 5,991,798 A | 11/1999 | Ozaki et al. |
| 5,995,091 A | 11/1999 | Near et al. |
| 5,996,000 A | 11/1999 | Shuster |
| 6,005,565 A | 12/1999 | Legall et al. |
| 6,009,410 A | 12/1999 | LeMole et al. |
| 6,011,758 A | 1/2000 | Dockes et al. |
| 6,018,768 A | 1/2000 | Ullman et al. |
| 6,025,837 A | 2/2000 | Matthews, III et al. |
| 6,029,142 A | 2/2000 | Hill |
| 6,031,795 A | 2/2000 | Wehmeyer |
| 6,032,130 A | 2/2000 | Alloul et al. |
| 6,034,925 A | 3/2000 | Wehmeyer |
| 6,061,680 A | 5/2000 | Scherf et al. |
| 6,112,240 A | 8/2000 | Pogue et al. |
| 6,128,255 A | 10/2000 | Yankowski |
| 6,128,625 A | 10/2000 | Yankowski |
| 6,138,162 A | 10/2000 | Pistriotto et al. |
| 6,147,940 A | 11/2000 | Yankowski |
| 6,154,773 A | 11/2000 | Roberts et al. |
| 6,161,132 A | 12/2000 | Roberts et al. |
| 6,175,857 B1 | 1/2001 | Hichaya et al. |
| 6,189,030 B1 | 2/2001 | Kirsch et al. |
| 6,195,693 B1 | 2/2001 | Berry et al. |
| 6,226,672 B1 | 5/2001 | DeMartin et al. |
| 6,230,192 B1 | 5/2001 | Roberts et al. |
| 6,243,725 B1 | 6/2001 | Hempleman et al. |
| 6,247,022 B1 | 6/2001 | Yankowski |
| 6,263,028 B1 | 7/2001 | Nagano |
| 6,263,505 B1 | 7/2001 | Walker et al. |
| 6,272,078 B2 | 8/2001 | Yankowski |
| 6,304,523 B1 | 10/2001 | Jones et al. |
| 6,314,570 B1 | 11/2001 | Tanigawa et al. |
| 6,324,694 B1 | 11/2001 | Watts et al. |
| 6,330,593 B1 | 12/2001 | Roberts et al. |
| 6,388,957 B2 | 5/2002 | Yankowski |
| 6,388,958 B1 | 5/2002 | Yankowski |
| 6,434,597 B1 | 8/2002 | Hachiya et al. |
| 6,457,076 B1 | 9/2002 | Cheng et al. |
| 6,496,802 B1 | 12/2002 | Van Zoest et al. |
| 6,505,160 B1 | 1/2003 | Levy et al. |
| 6,535,907 B1 | 3/2003 | Hachiya et al. |
| 6,609,105 B2 | 8/2003 | Story et al. |

| | | | |
|---|---|---|---|
| 6,636,249 | B1 | 10/2003 | Rekimoto |
| 6,671,736 | B2 | 12/2003 | Virine et al. |
| 6,829,368 | B2 | 12/2004 | Meyer et al. |
| 6,850,971 | B1* | 2/2005 | Murakoshi et al. .......... 709/217 |
| 6,941,275 | B1 | 9/2005 | Swierczek |
| 7,167,857 | B2 | 1/2007 | Roberts |
| 7,302,574 | B2 | 11/2007 | Conwell et al. |
| 7,308,485 | B2 | 12/2007 | Roberts et al. |
| 7,349,552 | B2 | 3/2008 | Levy et al. |
| 7,415,129 | B2 | 8/2008 | Rhoads |
| 7,461,136 | B2 | 12/2008 | Rhoads |
| 7,587,602 | B2 | 9/2009 | Rhoads |
| 7,590,259 | B2 | 9/2009 | Levy et al. |
| 2008/0307070 | A1 | 12/2008 | Roberts et al. |

FOREIGN PATENT DOCUMENTS

| | | |
|---|---|---|
| EP | 0460869 A2 | 12/1991 |
| EP | 0319567 B1 | 2/1993 |
| EP | 0814419 A2 | 12/1997 |
| EP | 1197020 B1 | 11/2007 |
| JP | 62-189867 | 8/1987 |
| JP | 05-317509 | 12/1993 |
| JP | 06-332483 | 12/1994 |
| JP | 07-095522 | 4/1995 |
| JP | 795522 | 4/1995 |
| JP | 07093359 A2 | 4/1995 |
| JP | 08-190527 | 7/1996 |
| JP | 08-194453 | 7/1996 |
| JP | 8194453 | 7/1996 |
| JP | 08-306167 | 11/1996 |
| JP | 08-306170 | 11/1996 |
| JP | 8306170 | 11/1996 |
| JP | 09-007020 | 1/1997 |
| JP | 09-016189 | 1/1997 |
| JP | 09-016476 | 1/1997 |
| JP | 916476 | 1/1997 |
| JP | 09-081473 | 3/1997 |
| JP | 10171818 | 6/1998 |
| WO | WO-9641285 A1 | 12/1996 |
| WO | WO-9705616 A1 | 2/1997 |
| WO | WO-9741504 A1 | 11/1997 |
| WO | WO-9800788 A1 | 1/1998 |
| WO | WO-9802820 A1 | 1/1998 |
| WO | WO-9847080 A2 | 10/1998 |
| WO | WO-9847080 A3 | 10/1998 |
| WO | WO-0128222 A2 | 4/2001 |

OTHER PUBLICATIONS

*Bookwhere for Windows v.1.1—Readme*, Sea Change Corporation, (1995), 2 pgs.
*GeoPac Management Guide, Release 1.25*, Geac Computer Corporation Limited, (Dec. 1994), 50 pgs.
*BookWhere for Windows v. 2.1—Readme*, Sea Change Corporation, (1996), 7 pgs.
*BookWhere for Windows User Guide*, Software Version 2.0—Manual Version 2.0.4, Sea Change Corporation, (Sep. 11, 1996), 1-36.
*Workman Changes, Release 1.3*, (1994), 5 pgs.
*Nikkei, Electronics*, 678, Nikkei Business Publications, Inc.,, (Dec. 16, 1996), 8.
*ASCIT Corporation*, 21, Internet Hizakurige Route 24, ASCIT, Japan, (Apr. 1, 1997), 465.
*BookWhere? for Windows Help v2.0*, Sea Change Corporation, (1996), 16 pgs.
*Online Systems: Sound Recordings Format*, OCLC Online Computer Library Center, Dublin Ohio, (1986), 1-318.
*Proposal No. 95-1—Changes to Field 856 (Electronic Location and Access) in the USMARC Bibliographic Format*, http://www.loc.gov/marc/marbi/1995/95-01.html, Source: Library of Congress; Federal Geographic Data Committee, (Dec. 2, 1994), 13 sheets.
*Proposal No. 95-8—Define Field 856 (Electronic Location and Access) in the USMARC Classification Format*, http://www.loc.gov/marc/marbi/1995/95-08.html, Source: Library of Congress, (May 5, 1995), 1-2.
*PURL Frequently Asked Questions*, http://purl.oclc.org/docs/purl_faq.html, (Mar. 20, 1996), 19 sheets.
"ANSI/NISO Z39.50-1995—Information retrieval (Z39.50): Application Service Definition and Protocol Specification", (1995), pp. i-vi & 1-156.
"U.S. Appl. No. 08/838,082, Non-Final Office Action mailed Sep. 28, 1998", 5 pgs.
"U.S. Appl. No. 08/838,082, Notice of Allowance mailed May 25, 1999", 6 pgs.
"U.S. Appl. No. 08/838,082, Response filed Mar. 29, 1999 to Non-Final Office Action mailed Sep. 28, 1998", 13 pgs.
"U.S. Appl. No. 09/354,165, Notice of Allowance mailed Dec. 18, 2000", 4 pgs.
"U.S. Appl. No. 09/354,165, Preliminary Amendment mailed Jul. 16, 1999", 4 pgs.
"U.S. Appl. No. 09/354,167, Notice of Allowance mailed Mar. 14, 2000", 3 pgs.
"U.S. Appl. No. 09/354,167, Preliminary Amendment mailed Jul. 16, 1999", 8 pgs.
"U.S. Appl. No. 09/379,588, Final Office Action mailed Mar. 6, 2000", 8 pgs.
"U.S. Appl. No. 09/379,588, Non-Final Office Action mailed Dec. 13, 1999", 8 pgs.
"U.S. Appl. No. 09/379,588, Notice of Allowance mailed Jul. 13, 2000", 3 pgs.
"U.S. Appl. No. 09/379,588, Preliminary Amendment mailed Aug. 24, 1999", 14 pgs.
"U.S. Appl. No. 09/379,588, Response filed Feb. 22, 2000 to Non-Final Office Action mailed Dec. 13, 1999", 12 pgs.
"U.S. Appl. No. 09/379,588, Response filed Jul. 6, 2000 to Final Office Action mailed Mar. 6, 2000", 2 pgs.
"U.S. Appl. No. 09/379,589, Amendment Under 37 CFR 1.116 mailed Aug. 6, 2001", 10 pgs.
"U.S. Appl. No. 09/379,589, Final Office Action mailed Apr. 4, 2000", 9 pgs.
"U.S. Appl. No. 09/379,589, Final Office Action mailed May 4, 2001", 8 pgs.
"U.S. Appl. No. 09/379,589, Non-Final Office Action mailed Oct. 20, 2000", 6 pgs.
"U.S. Appl. No. 09/379,589, Non-Final Office Action mailed Dec. 13, 1999", 6 pgs.
"U.S. Appl. No. 09/379,589, Notice of Allowance mailed Aug. 17, 2001", 3 pgs.
"U.S. Appl. No. 09/379,589, Preliminary Amendment mailed Aug. 24, 1999", 12 pgs.
"U.S. Appl. No. 09/379,589, Response filed Feb. 23, 2000 to Non-Final Office Action mailed Dec. 13, 1999", 10 pgs.
"U.S. Appl. No. 09/379,589, Response filed Mar. 20, 2001 to Non-Final Office Action mailed Oct. 20, 2000", 10 pgs.
"U.S. Appl. No. 09/379,589, Response filed Oct. 4, 2000 to Final Office Action mailed Apr. 4, 2000", 16 pgs.
"U.S. Appl. No. 09/820,722, Advisory Action mailed Jan. 27, 2006", 2 pgs.
"U.S. Appl. No. 09/820,722, Final Office Action mailed Jun. 23, 2005", 9 pgs.
"U.S. Appl. No. 09/820,722, Non-Final Office Action mailed May 3, 2007", 8 pgs.
"U.S. Appl. No. 09/820,722, Non-Final Office Action mailed Aug. 2, 2006", 9 pgs.
"U.S. Appl. No. 09/820,722, Non-Final Office Action mailed Oct. 21, 2004", 6 pgs.
"U.S. Appl. No. 09/820,722, Non-Final Office Action mailed Dec. 24, 2003", 8 pgs.
"U.S. Appl. No. 09/820,722, Notice of Allowance mailed Jan. 12, 2007", 4 pgs.
"U.S. Appl. No. 09/820,722, Notice of Allowance mailed Sep. 20, 2007", 8 pgs.
"U.S. Appl. No. 09/820,722, Preliminary Amendment mailed Mar. 30, 2001", 14 pgs.

"U.S. Appl. No. 09/820,722, Response filed Apr. 25, 2005 to Non-Final Office Action mailed Oct. 21, 2004", 15 pgs.

"U.S. Appl. No. 09/820,722, Response filed Aug. 2, 2007 to Non-Final Office Action mailed May 3, 2007", 13 pgs.

"U.S. Appl. No. 09/820,722, Response filed Aug. 6, 2004 to Non-Final Office Action mailed Jul. 7, 2004", 16 pgs.

"U.S. Appl. No. 09/820,722, Response filed Dec. 4, 2006 to Non-Final Office Action mailed Nov. 2, 2006", 18 pgs.

"U.S. Appl. No. 09/820,722, Response filed Dec. 23, 2005 to Final Office Action mailed Jun. 23, 2005", 25 pgs.

"U.S. Appl. No. 10/281,948, Non-Final Office Action mailed May 17, 2005", 9 pgs.

"U.S. Appl. No. 10/281,948, Notice of Allowance mailed Feb. 9, 2006", 7 pgs.

"U.S. Appl. No. 10/281,948, Notice of Allowance mailed Aug. 21, 2006", 7 pgs.

"U.S. Appl. No. 10/281,948, Response filed Oct. 19, 2005 to Non-Final Office Action mailed May 17, 2005", 12 pgs.

"CNET: The Computer Network Unveils Revolutionary Internet Advertising Tools that Allow Custom Banner Ad Delivery Based on Demographic Information", http://www.cnet.com/html/aboutcnet/press/1994_95/120695.html, Press Releases, (Dec. 6, 1995), 4 pgs.

"European Application Serial No. 03006164.2, Office Action mailed Jul. 2, 2008", OAR-4MO, 4 pgs.

"Frequently Asked Questions, Troubleshooting ConnecteD", printed on Mar. 10, 2005 from jenniferlopez.com/ConnectedD/fab.html, 1-5.

"International Application Serial No. 03006164.2, European Office Action mailed Nov. 16, 2004", 5 pgs.

"International Application Serial No. 03006164.2, European Office Action mailed Dec. 14, 2005", 5 pgs.

"International Application Serial No. 03006164.2, European Search Report mailed Jun. 25, 2003", 3 pgs.

"International Application Serial No. PCT/US98/07660, International Search Report mailed Nov. 26, 1998", 3 pgs.

"Japanese Application Serial No. 2007-100966, Office Action mailed Feb. 5, 2008", 11 pgs.

"Japanese Application Serial No. 2007-100966, Office Action mailed Jun. 24, 2008", 11 pgs.

"Office Action for Japanese Application No. 10-544286", mailed May 29, 2007, 10 pgs.

"Office Action for Japanese Application No. 2007-100966", mailed May 29, 2007, 8 pgs.

"Office Action for Japanese Application No. 2007-59701", mailed Jun. 5, 2007, 10 pgs.

"Proposal No. 97-9", *Renaming of subfield 856$u to accommodate URNs*, (May 1, 1997).

"Protocol Specification for Internet Protocol—RFC 791", *DARPA Internet Program*, (Sep. 1981), pp. i-iii, 1-45.

"Record for DISCID af0f630c", *from xmcd 1.4 CD database file*, 1996.

"Record for DISCID af0f630c, Revision 1", *processed by cddb v1.4b14PL0*, 1996.

"Table of Contents of the Proceedings of the 1994 ACM European Conference on Hypermedia Technology", *Printed from The ACM Digital Library*, (1994), 4 pgs.

"Table of Contents of the Proceedings of the ACM Conference on Hypertext", *Printed from The ACM Digital Library*, (1992), 4 pgs.

"Table of Contents of the Proceedings of the Fifth ACM Conference on Hypertext", *Printed from The ACM Digital Library*, (1993), 4 pgs.

"Table of Contents of the Proceedings of the First ACM International Conference on Multimedia", *Printed from The ACM Digital Library*, (1993), 6 pgs.

"Table of Contents of the Proceedings of the Fourth ACM International Conference on Multimedia", *from the ACM Digital Library*, (1996), 7 pgs.

"Table of Contents of the Proceedings of the Second ACM International Conference on Multimedia", *from the ACM Digital Library*, (1994), 10 pgs.

"Table of Contents of the Proceedings of the Second Annual ACM Conference on Hypertext", *Printed from The ACM Digital Library*, (1989), 4 pgs.

"Table of Contents of the Proceedings of the Seventh ACM Conference on Hypertext", *Printed from The ACM Digital Library*, (1996), 4 pgs.

"Table of Contents of the Proceedings of the Third ACM International Conference on Multimedia", *from The ACM Digital Library*, (1995), 8 pgs.

"Table of Contents of the Proceedings of the Third Annual ACM Conference on Hypertext", *Printed from The ACM Digital Library*, (1991), 5 pgs.

"USMARC Format for Bibliographic Data—Update 2", *Prepared by Network Development & MARC Standards Office, Cataloging Distribution Service, Library of Congress*, (Mar. 1996), 578 pgs.

"USMARC Format for Bibliographic Data, Including Guidelines for Content Designation", *Prepared by Network Development & MARC Standards Office, Cataloging Distribution Service, Library of Congress*, (1994), 547 pgs.

"Win32 Programmer's Reference vol. 2: System Services, Multimedia Extensions and Application Notes", *Microsoft Press*, (1993), 517-519, 521-672.

"ZIG Meeting Minutes", *for* Sep. 1995, 1-22.

Akscyn, Robert M., et al., "Design of hypermedia script languages: the KMS experience", *Proceedings of the Fifth ACM Conference on Hypertext*, (1993), 268-269.

Baugher, Mark, et al., "A multimedia client to the IBM LAN server", *Proceedings of the first ACM International Conference on Multimedia*, (1993), 105-112.

Berners-Lee, T., et al., *Hypertext Transfer Protocol—HTTP 1.0*, Network Working Group, (May 1996), 61 pgs.

Berners-Lee, Tim, et al., "Weaving the Web", (1999), 188, 189, 211-219.

Caruso, Denise, "CD-I Has a Rough Row to Hoe", *Digital Media*, printed on Mar. 10, 2005 from www.Caruso.com/Digital_Media/DM91-07.TXT, (Jul. 1991), 1-13.

Chua, T. S., et al., "Content-based retrieval of segmented images", *Proceedings of the Second ACM International Conference on Multimedia*, (1994), 211-218.

Comer, Douglas E., et al., *Internetworking with TCP/IP, vol. 2. Design, implementation, and internals*, ANSI C Version, 3rd Edition, Upper Saddle River, NJ: Prentice Hall, (1999), 1-660.

Comer, Douglas E., et al., *Internetworking with TCP/IP, vol. 3, Client-server programming and applications*, BSD Socket Version, Upper Saddle River, NJ: Prentice Hall, (1993), 1-498.

Comer, Douglas, et al., "Chapter 4—Internet Addresses & Chapter 5—Mapping Internet Addresses to Physical Addresses (ARP)", *Internetworking with TCP/IP*, vol. 1, Upper Saddle River, N.J. : Prentice Hall, (1995), 59-88, 588.

Courtiat, J. P., et al., "Towards a new multimedia synchronization mechanism and its formal definition", *Proceedings of the Second ACM International Conference on Multimedia*, (1994), 133-140.

Deep, John, et al., *Developing CGI applications with Perl*, New York : Wiley Computer Pub., (1996), 72-77.

Deroure, David, et al., "A Multiagent system for Content Based Navigation of Music", *Proceedings of the Seventh ACM International Conference on Multimedia*, (1999), 63-68.

Eddings, Joshua, *How the Internet Works*, Emeryville, Calif. : Ziff-Davis Press, (1994), pp. 136-147, 158, 159.

Ghandeharizadeh, S., et al., "On multimedia repositories, personal computers, and hierarchical storage systems", *Proceedings of the Second ACM International Conference on Multimedia*, (1994), 407-416.

Graham, Ian S., "The HTML Sourcebook", *John Wiley & Sons*, (1995).

Harada, M., "Cooperative Service of WWW and CD from Disk-Based to Server-Based", *Nikkeir Electronics*, vol. 679, (Jan. 6, 1997), 13-14.

Hertzfeld, Andy, "User interface and artistic values", http://hci.stanford.edu/cs547/abstracts/91-92/920415-hertzfeld.html, Stanford University Program in Human-Computer Interaction, (Apr. 15, 1992).

Hirata, K., et al., "Media-based navigation for hypermedia systems", *Proceedings of the Fifth ACM Conference on Hypertext*, (1993), 159-173.

Hiroshige, G., "Microsoft Announces 'PC98' in April Presentation of Annual PC SPEC for the Coming Year at WINHEC", *DOS/V Power Report*, 7(4), (Apr. 1, 1997), 227.

Kan, Ti, *XMCD Unix CD Player*, (Mar. 21, 1996), 1358 pgs.

Kan, Ti, *XMCD Version 2.0 patchlevel 0*, BSD News Article 64976, (Apr. 3, 1996), 10 pgs.

Lenk, John D., *Lenk's laser handbook : featuring CD, CDV, and CD-ROM technology*, New York : McGraw-Hill, (1992), 2.1-2.13.

Lewis, P. H., et al., "Content based navigation in multimedia information systems", *Proceedings of the Fourth ACM International Conference on Multimedia*, (1996), 415-416.

Lewis, Paul H., et al., "Media-based Navigation with Generic Links", *Proceedings of the the Seventh ACM Conference on Hypertext*, (1996), 215-223.

Li, L., et al., "MPEG-2 coded- and uncoded-stream synchronization control for real-time multimedia transmission and presentation over B-ISDN", *Proceedings of the Second ACM International Conference on Multimedia*, (1994), 239-246.

Lienhart, R., "Automatic text recognition for video indexing", *Proceedings of the Fourth ACM International Conference on Multimedia*, (1997), 11-20.

Little, T. D.C., et al., "A digital on-demand video service supporting content-based queries", *Proceedings of the First ACM International Conference on Multimedia*, (1993), 427-436.

Mascha, M., et al., "Interactive education: Transitioning CD-ROMs to the Web", *Computer Networks and ISDN Systems*, 27(2), (Nov. 1994), 267-272.

Mayer-Patel, Ketan, et al., "Synchronized continuous media playback through the World Wide Web", *Proceedings of the Fourth ACM International Conference on Multimedia*, (1997), 435-436.

Oikarinen, J., et al., "Internet Relay Chat Protocol", *RFC 1459, Network Working Group*, (May 1993).

Petkovic, Dragutin, et al., "Multimedia Databases and Information Systems", *Proceedings of the Second ACM International Conference on Multimedia*, (1994), p. 67.

Prabhakaran, B., et al., "Synchronization models for multimedia presentation with user participation", *Proceedings of the First ACM International Conference on Multimedia*, (1993), 157-166.

Qazi, Naveed U., et al., "A synchronization and communication model for distributed multimedia objects", *Proceedings of the First ACM International Conference on Multimedia*, (1993), 9 pgs.

Roscheisen, M., et al., "Beyond Browsing: Shared Comments, SOAPs, Trails and On-Line Communities", *Computer Networks and ISDN Systems*, 27(6), North Holland Publishing, (Apr. 1995), 739-749.

Scherf, Steve, *cddbd—CD Database Protocol Server*, Moondog Software Productions, (1996), 48 sheets.

Seltzer, Richard, "The AltaVista Search Revolution", *Osborne McGraw-Hill*, (1997), 7, 8; 215-37.

Shafer, Keith, et al., "Introduction to Persistent Uniform Resource Locators", http://purl.oclc.org/docs/inet96.html, OCLC Online Computer Library Center, Inc., (1996), 8 pgs.

Shibata, Y., et al., "Dynamic hypertext and knowledge agent systems for multimedia information networks", *Proceedings of the Fifth ACM Conference on Hypertext*, (1993), 82-93.

Smith, Brian C., et al., "The Berkeley continuous media toolkit", *Proceedings of the Fourth ACM International Conference on Multimedia*, (1997), 451-452.

Tompa, F. W., et al., "Hypertext by link-resolving components", *Proceedings of the Fifth ACM Conference on Hypertext*, (1993), 118-130.

Troll, Denise, *Z39.50 Implementors Group Meeting Minutes*, ftp://lcweb.loc.gov/pub/z3950/minutes/9504.txt, (Apr. 25, 1995), 29 pgs.

Weitzman, L., et al., "Automatic presentation of multimedia documents using relational grammars", *Proceedings of the Second ACM International Conference on Multimedia*, (1994), 443-451.

Zhang, H., et al., "Video Parsing, Retrieval and Browsing: An Integrated and Content-Based Solution", *Proceedings of ACM Multimedia '95*, San Francisco, CA, (Nov. 5-9, 1995), 15-24.

"U.S. Appl. No. 08/838,082, Non-Final Office Action mailed Sep. 28, 1998", 5 pgs.

"U.S. Appl. No. 08/838,082, Notice of Allowance mailed May 25, 1999", 6 pgs.

"U.S. Appl. No. 08/838,082, Response filed Mar. 29, 1999 to Non Final Office Action mailed Sep. 28, 1999", 12 pgs.

"International Application Serial No. PCT/US 98/07660, International Search Report mailed Nov. 26, 1998",, 3 pgs.

Ido, S, "Multimedia Research Forefront-5", *Business Communications*. 34,(3), (Mar. 1, 1997), 3 pgs.

10-544286, "Japanese Application No. 10-544286, JP Office Action mailed Sep. 30, 2008", 8 pgs.

2007-100966, "Japan Application No. 2007-100966 ,Office Action mailed on Feb. 24, 2009", 7.

2007-59701, "Japanese Application No. 2007-59701, JP Office Action mailed on Sep. 30, 2008", 8 pgs.

2007-59701, "Japanese Application No. 2007-59701, Notice of Allowance mailed Jun. 2, 2009", 4 pgs.

"U.S. Appl. No. 09/060,876, Final Office Action mailed Mar. 10, 2000", 6 pgs.

"U.S. Appl. No. 09/060,876, Non Final Office Action mailed Oct. 22, 1999", 6 pgs.

"U.S. Appl. No. 09/060,876, Notice of Allowance mailed Jul. 13, 2000", 2 pgs.

"U.S. Appl. No. 09/060,876, Response filed Feb. 22, 2000 to Non Final Office Action mailed Oct. 22, 1999", 10 pgs.

"U.S. Appl. No. 09/060,876, Response filed Jul. 6, 2000 to Final Office Action mailed Mar. 10, 2000", 2 pgs.

"U.S. Appl. No. 09/354,166, 312 Amendment filed Jan. 9, 2001", 2 pgs.

"U.S. Appl. No. 09/354,166, Advisory Action mailed Jul. 13, 2000", 1 pg.

"U.S. Appl. No. 09/354,166, Final Office Action mailed Mar. 6, 2000", 10 pgs.

"U.S. Appl. No. 09/354,166, Non Final Office Action mailed Sep. 26, 2000", 5 pgs.

"U.S. Appl. No. 09/354,166, Non Final Office Action mailed Oct. 22, 1999", 8 pgs.

"U.S. Appl. No. 09/354,166, Notice of Allowance mailed Dec. 29, 2000", 4 pgs.

"U.S. Appl. No. 09/354,166, Response filed Feb. 22, 2000 to Non Final Office Action mailed Oct. 22, 1999", 25 pgs.

"U.S. Appl. No. 09/354,166, Response filed Jul. 6, 2000 to Non Final Office Action mailed Mar. 6, 2000", 2 pgs.

"U.S. Appl. No. 09/354,166, Response filed Sep. 6, 2000 to Advisory Action mailed Jul. 13, 2000", 4 pgs.

"U.S. Appl. No. 09/354,166, Response filed Dec. 4, 2000 to Non Final Office Action mailed Sep. 26, 2000", 6 pgs.

"U.S. Appl. No. 09/354,166, Supplemental Amendment filed Dec. 18, 2000", 2 pgs.

"U.S. Appl. No. 09/379,589, Preliminary Amendment filed Oct. 4, 2000", 16 pgs.

"U.S. Appl. No. 09/820,722, Response filed May 24, 2004 to Non Final Office Action mailed Dec. 24, 2003", 16 pgs.

\* cited by examiner

METHOD AND SYSTEM FOR ACCESSING WEB PAGES BASED ON PLAYBACK OF RECORDINGS

CROSS REFERENCE TO RELATED APPLICATIONS

This is a continuation of U.S. patent application Ser. No. 09/820,722, filed Mar. 30, 2001, now U.S. Pat. No. 7,308,485, which is a continuation of U.S. patent application Ser. No. 09/354,166, filed Jul. 16, 1999, now U.S. Pat. No. 6,230,192, which is a divisional of U.S. patent application Ser. No. 08/838,082, filed Apr. 15, 1997, now U.S. Pat. No. 5,987,525, and Ser. No. 09/060,876, filed Apr. 15, 1998, now U.S. Pat. No. 6,154,773, all of which are hereby incorporated by reference.

BACKGROUND

Described below are methods and systems relating to the field of computer networking, and more particularly to the use of network protocols to provide services to users which are related to audio recordings.

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfill this promise.

SUMMARY

An aspect is to provide computer programs, systems, and protocols which allow producers to deliver entertainment complementary to musical recordings by on-line services such as the Internet. It is a further aspect to provide computer programs, systems, and protocols which allow such complementary entertainment to be meaningfully interactive for the consumer, such that the consumer can also be a creator of the experience.

Another aspect is to achieve the foregoing by implementations designed to attain integration with existing environments and programs, particularly on the Internet, while retaining the flexibility to adapt to the continuing evolution of standards for on-line services.

In one of the aspects, software is provided which permits a computer program running on a remote host to control a compact disc (CD) player, DVD player, or the like on a user's computer. (For convenience, we use the term "CD player" to refer also to DVD players and similar devices.) The software is designed to permit the remote host both to initiate actions on the CD player and to become aware of actions which the user has initiated by other controls, such as the buttons on the CD player's front panel or a different CD player control program. This aspect is a building-block for the provision of complementary entertainment for musical recordings when those recordings are fixed in the prevailing contemporary form, the audio CD.

In a second aspect, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the Rosary Sonatas of Heinrich Ignaz Franz Biber, it would presumably not function well if the CD in the user's player were the soundtrack for the film Mary Poppins. The unique identifier also allows a CD to be used as a key to access a premium Web area. Furthermore, the unique identifier can allow the user to be directed to an area of the Web corresponding to the CD which is in the user's machine.

In a fourth aspect, the immensely popular on-line service generally referred to as a "chat room" may be enhanced by a link to a musical recording to which all persons in the room are listening. The chat room experience as it exists today in on-line services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by shared interests in a particular type of recording.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

1. Introduction

The preferred embodiment operates on the World Wide Web. The software implementation environment provided by the World Wide Web is described in a number of books, for example, John December & Mark Ginsburg, HTML 3.2 and CGI Unleashed (1996). The World Wide Web is based on a network protocol called HTTP (hypertext transfer protocol), which is described in T. Berners-Lee et al., Hypertext Transfer Protocol—HYTP/1.0 (Internet Request for Comments No. 1945, 1996). The HTTP protocol must be run atop a general connection-oriented protocol, which today is generally TCP/IP, described in Douglas E. Corner, Internetworking with TCP/IP (3d ed. 1995). However, the method and system described here are not limited to HTTP running over any particular kind of network software or hardware. The principles apply to other protocols for access to remote information that may come to compete with or supplant HTTP.

Figure 1:
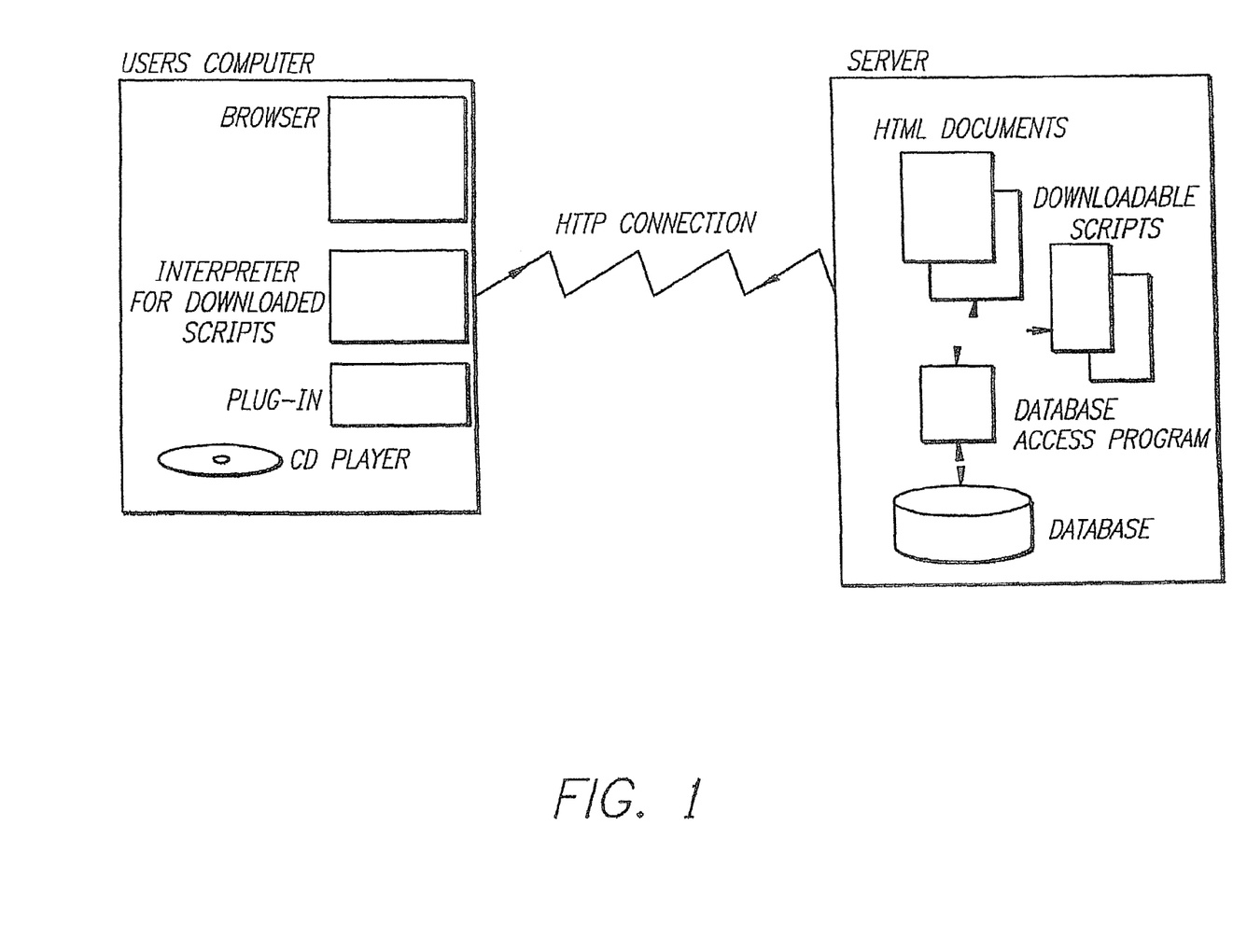
FIG. 1 is a block diagram of the environment in which the preferred embodiment operates.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by uniform resource locators (URL's), character strings in a particular format defined in Berners-Lee et al., supra. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the user's prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

2. Command Plug-In

A preferred embodiment employs a plug-in, referred to as the command plug-in, which provides to a scripting language the ability to command in a detailed fashion the playing of a musical recording. The command plug-in should provide, at a minimum, the following basic functions:

(1) Start and stop play.
(2) Get current track and position within the track.
(3) Seek to a track and a position within the track.
(4) Get and set volume.
(5) Get information regarding the CD (e.g., the number of tracks, their lengths, the pauses between tracks).
(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in Microsoft Win32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write ActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

3. Synchronization

The existence of a command plug-in providing the functions listed above to a scripting language is a foundation on which entertainment complementary to a musical recording may be constructed. In particular, it is possible to devise, building on this foundation, a method for synchronizing the display of visual content by the scripting language with the events which are occurring on the audio CD.

In a preferred embodiment, the synchronization of the visual content to the audio CD proceeds as follows. The visual content is provided by a Shockwave animation, which is downloaded from the server and displayed for the user by a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by using the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed, or because the user has fast forwarded the CD.

In a variant form of this synchronization algorithm (shown in FIG. 2), the frames of the animation are arranged into groups of contiguous frames. A correspondence is established between each such group of frames and a particular segment of the audio recording (box 200 in FIG. 2). At the end of each frame of the animation, the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

4. Unique Identifiers for Audio CDs

A further aspect is the ability, by making use of the command plug-in, to provide a technique for establishing a unique identifier for an audio CD which is located in the user's CD player. The unique identifier may be based on the number and lengths of the tracks (measured in blocks, i.e., {fraction (1/75)}ths of a second), so that the identifier would be a concatenation of these lengths. In practice, however, it is desirable to have a somewhat shorter identifier, so the unique identifier is preferably the concatenation of the track lengths expressed in a fairly coarse unit, such as ¼th of a second.

Appendix A contains source code, written in C, for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2^8=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Appendix B contains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives a URL, and (iii) the browser does an HTTP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by a script which invokes the functions provided by the command plug-in and computes a unique identifier.

5. Chat Rooms Connected with Musical Recordings

A third aspect is the connection of chat rooms with musical recordings. The goal is to provide all participants in a chat room with the same music at approximately the same time.

The prevailing network protocol for chat services is Internet Relay Chat (IRC), described J. Oikarinen & D. Reed, Internet Relay Chat Protocol (Internet Request for Comments No. 1459, 1993). In this protocol, when one becomes a client of a chat server, one sends the name of a chat room. The chat server receives messages from all of its of clients and relays the messages sent in by one client to all the other clients connected in the same room as that client. The messages which a client sends are typically typed in by the user who is running the client, and the messages which a client receives are typically displayed for the user who is running the client to read.

In a preferred embodiment, a chat client is customized by a plug-in, which we will call the chat plug-in. The chat client is started up by a browser as follows (see FIG. 3). The user connects via the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

Figure 3:
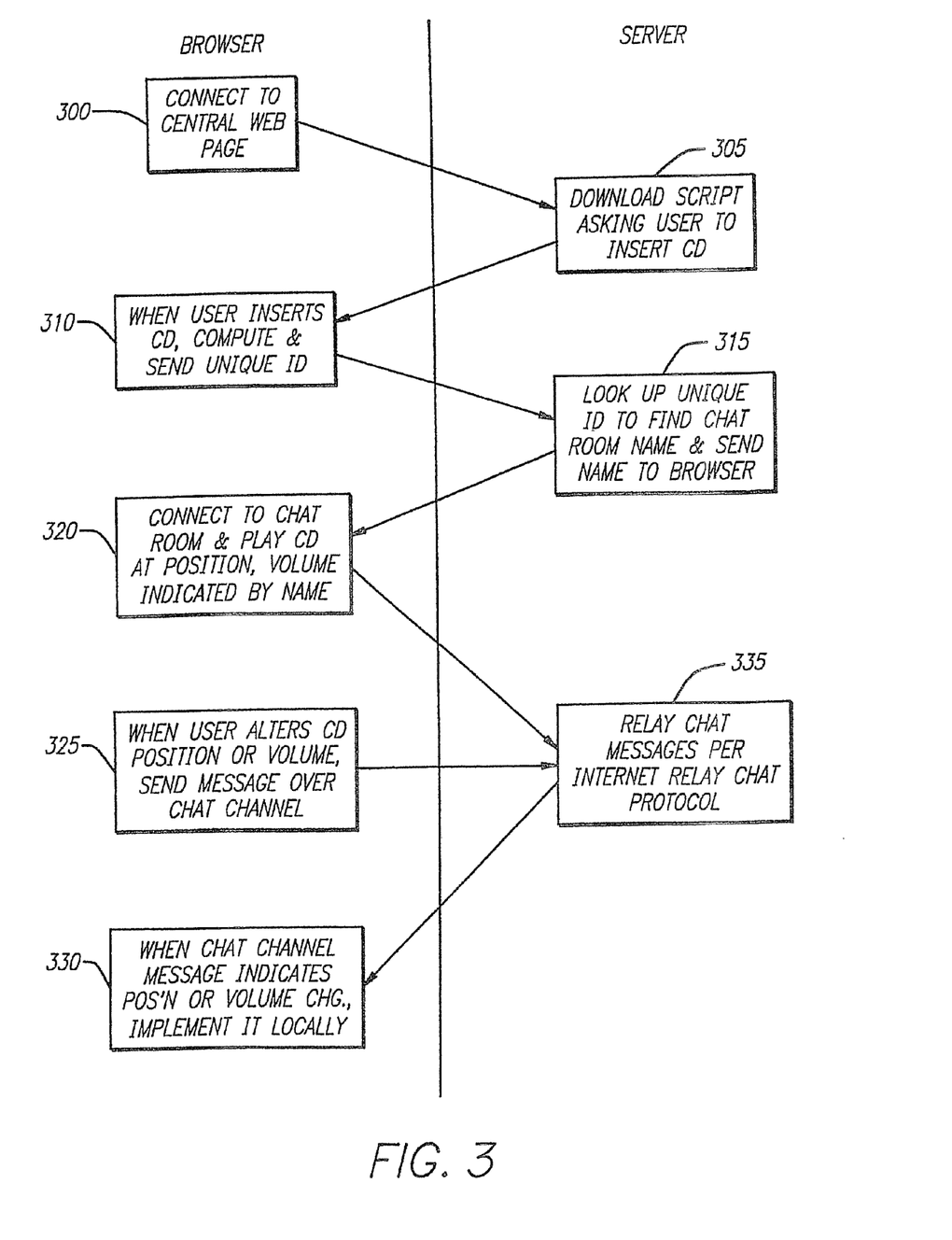
FIG. 3 is a flowchart of the sequence of operations for connection to a chat room focused on a musical recording.

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect the messages delivered to the users of a chat can be driven from a text file rather than manual typing. This would allow a prerecorded experience to be played back for a group of chat users. Such a technique may be used to create a pre-recorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-n and in the central Web page, with its connection to a database of CD information.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

APPENDIX A

```
/*
 * FUZZY CD ID
 * (c) 1996 ION
 *
 *
 * by Ty Roberts
 */
#include <stdio.h>
#include <stdlib.h>
#include <time.h>
struct fuzzyCDid {
        short                    numTracks;      // start time in
                                                 milliseconds
        unsigned short           fuzzlength[100];
};
typedef struct fuzzyCDid fuzzyCDid, *fuzzyCDidPtr;
// structure of a cd track with all times stored in milliseconds
struct cdtrack {
        long      beginMs;       // start time in milliseconds
        long      endMs;         // end time in milliseconds
        long      lengthMs;      // length in milliseconds
};
typedef struct cdtrack cdtrack, *cdTrackPtr;
struct cd {
        short     numTracks;
        cdtrack           track[100];
};
typedef struct cd cd, *cdPtr;
void CreateFuzzyId( fuzzyCDidPtr fid, cdPtr cd );
float    FuzzyMatch( fuzzyCDidPtr fid1, fuzzyCDidPtr fid2 );
// SUBROUTINES
void CreateFuzzyId( fuzzyCDidPtr fid, cdPtr cd )
{
        long              i;
        // first copy in the number of tracks
        fid->numTracks = cd->numTracks;
        for(i=0;i<fid->numTracks;i++) {
                // shift left and create a MSB length thats not exact
                fid->fuzzlength[i] = (short)(cd->track[i].length-
MS>>8);
        }
}
float    FuzzyMatch( fuzzyCDidPtr fid1, fuzzyCDidPtr fid2 )
{
        long              fidmatcherr = 0, fidmatchtotal = 0;
        short             i, trackcnt;
        float             matchpercent;
        // find the larger number of tracks
        trackcnt = fid 1->numTracks<fid2->numTracks ? fid2->
numTracks : fid1->numTracks;
        // cycle thru the tracks accumulating error and total
comparedtimes for(i=0;i<trackcnt;i++) {
                if ((i < fid1->numTracks) && (i <
fid2->numTracks)) {
                        fidmatcherr += abs(fid1->fuzzlength[i] −
fid2->fuzzlength[i]);
                        fidmatchtotal += fid1->fuzzlength[i];
```

APPENDIX A-continued

```
            } else if (i >= fid2->numTracks) {
                    fidmatcherr += fid1->fuzzlength[i];
                    fidmatchtotal += fid1->fuzzlength[i];
            } else if (i >= fid1->numTracks) {
                    fidmatcherr += fid2->fuzzlength[i];
                    fidmatchtotal += fid2->fuzzlength[i];
            }
    }
    if (fidmatcherr > 0) {
            matchpercent = 100 - (((float)fidmatcherr/(float)fid-
matchtotal) *100);
    } else {
            matchpercent = 100;
    }
    return matchpercent;
}
void main(void)
{
    short i;
    float   matchpercent;
    // create global structures for two complete cds with up to 100
tracks
    cd      cd2id;
    fuzzyCDid fidcd2id;
    cd      cdFromDB;
    fuzzyCDid fidcdFromDB;
    printf ("Test #1 will compare two CDs that are exactly the
same\n\n");
    // put in some test values for the cd track lengths
    // since these are in ms, its basically 60000 = 1 minute
    cd2id.track[0].lengthMs = 121323;
    cd2id.track[1].lengthMs = 234565;
    cd2id.track[2].lengthMs = 566437;
    cd2id.track[3].lengthMs = 245120;
    cd2id.track[4].lengthMs = 20000;
    cd2id.track[5].lengthMs = 120386;
    cd2id.track[6].lengthMs = 323453;
    cd2id.numTracks = 7;
    for(i = 1;i<cd2id.numTracks;i++) {
            printf ("CD #1: Track = %d length in minutes =
                           %f\n", i, (float)cd2id.track[i].length-
Ms/60000.0);
    }
    printf("\n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.track[6].lengthMs = 323453;
    cdFromDB.numTracks = 7;
    for(i=1;i<cdFromDB.numTracks;i++) {
            printf ("CD #2: Track = %d length in minutes =
                           %f\n", i, (float)cdFromDB.track[i].length-
Ms/60000.0);
    }
    CreateFuzzyId( &fidcd2id, &cd2id );
    CreateFuzzyId( &fidcdFromDB, &cdFromDB );
    matchpercent = FuzzyMatch( &fidcd2id, &fidcdFromDB );
    printf ("The cd's matchpercent was computed as=%f",
matchpercent);
    printf ("\n");
    printf ("\n");
    printf ("Test #2 will compare two cd that are nearly the
same\nexcept they have diffent # of tracks \n");
    // put in some test values for the cd track lengths
    // since these are in ms, its basically 60000 = 1 minute
    cd2id.track[0].lengthMs = 121323;
    cd2id.track[1].lengthMs = 234565;
    cd2id.track[2].lengthMs = 566437;
    cd2id.track[3].lengthMs = 245120;
    cd2id.track[4].lengthMs = 20000;
    cd2id.track[5].lengthMs = 120386;
    cd2id.track[6].lengthMs = 323453;
    cd2id.numTracks = 7;
    for(i=1;i<cd2id.numTracks;i++) {
            printf ("CD #1: Track =%d length in minutes =%f\n",
                           i, (float)cd2id. track[i].lengthMs/60000.0 );
    }
    printf ("\n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.numTracks = 6;
    for(i = 1;i<cdFromDB.numTracks;i++) {
            printf ("CD #2: Track = %d length in minutes =
                           %f\n", i, (float)cdFromDB.track[i].length-
Ms/60000.0 );
    }
    CreateFuzzyId( &fidcd2id, &cd2id );
    CreateFuzzyId( &fidcdFromDB, &cdFromDB );
    matchpercent = FuzzyMatch( &fidcd2id, &fidcdFromDB );
    printf ("The cd's matchpercent was computed as=
%f",matchpercent);
    printf ("\n");
    printf ("\n");
    printf ("Test #3 will compare two cd that are not the same\n\n");
    // put in some test values for the cd track lengths
    // since these are in ms, its basically 60000 = 1 minute
    cd2id.track[0].lengthMs = 34213;
    cd2id.track[1].lengthMs = 334565;
    cd2id.track[2].lengthMs = 231423;
    cd2id.track[3].lengthMs = 134122;
    cd2id.track[4].lengthMs = 2342;
    cd2id.track[5].lengthMs = 3487;
    cd2id.track[6].lengthMs = 9976;
    cd2id.numTracks = 7;
    for(i = 1;i<cd2id.numTracks;i++) {
            printf ("CD #1: Track = %d length in minutes =
                           %f\n", i, (float)cd2id.track[i].length-
Ms\60000.0 );
    }
    printf ("\n");
    cdFromDB.track[0].lengthMs = 121323;
    cdFromDB.track[1].lengthMs = 234565,
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.track[6].lengthMs = 323453;
    cdFromDB.numTracks = 6;
    for(i = 1;i<cdFromDB.numTracks;i++) {
            printf ("CD #2: Track = %d length in minutes =%f\n",
                           i, (float)cdFromDB.track[i].length-
Ms/60000.0 );
    }
    CreateFuzzyId( &fidcd2id, &cd2id);
    CreateFuzzyId( &fidcdFromDB, &cdFromDB);
    matchpercent = FuzzyMatch( &fidcd2id, &fidcdFromDB );
    printf ("The cd's matchpercent was computed as =
%f",matchpercent);
}
```

APPENDIX B

```
/*
 * EXACT MATCH CD ID
 * - 1996 ION
 *
 *
 * by Ty Roberts
 */
#include <stdio.h>
#include <stdlib.h>
#include <time.h>
struct cdid{
        long    id[2];
};
typedef struct cdid cdid, *cdidptr;
// structure of a cd track with all times stored in milliseconds
struct cdtrack{
```

APPENDIX B-continued

```
            long    beginMs;        // start time in miliseconds
            long    endMs;          // end time in
                                       miliseconds
            long    lengthMs;       // length in Miliseconds
};
typedef struct cdtrack cdtrack, *cdTrackPtr;
struct cd {
            short   numTracks;
            cdtrack         track[100];
};
typedef struct cd cd, *cdPtr;
void CreateUniqueId( cdidPtr cid, cdPtr cd );
// SUBROUTINES
void CreateUniqueId( cdidPtr cid, cdPtr cd )
{
            long            i, t, n;
            t = 0;
            n = 0;
            for(i=0;i<cd->numTracks;i++) {
                        // shift left and create a MSB length thats not exact
                        t += cd->track[i].lengthMs;
                        n += cd->track[i].beginMs + cd->track[i].endMs;
            }
            cid->id[0] = t<<10+cd->numTracks;
            cid->id[1] = n;
}
void main(void)
{
            short i;
            short   matchtest;
            // create global structures for two complete cds with up to 100
tracks
            cd          cd2id;
            cdid cd2UID;
            cd          cdFromDB;
            cdid cdFromDBUID;
            printf ("Test #1 will compare two cd that are exactly the
same\n\n");
            // put in some test values for the cd track lengths
            // since thes are in ms, its basically 60000 = 1 minute
            cd2id.track[0].beginMs = 0;
            cd2id.track[1].beginMs = 100001;
            cd2id.track[2].beginMs = 231001;
            cd2id.track[3].beginMs = 345001;
            cd2id.track[4].beginMs = 435001;
            cd2id.track[5].beginMs = 460001;
            cd2id.track[6].beginMs = 590001;
            cd2id.track[0].endMs = 100000;
            cd2id.track[1].endMs = 231000;
            cd2id.track[2].endMs = 345000;
            cd2id.track[3].endMs = 435000;
            cd2id.track[4].endMs = 460000;
            cd2id.track[5].endMs = 590000;
            cd2id.track[6].endMs = 690000;
            cd2id.track[0].lengthMs = cd2id.track[0].endMs –
cd2id.track[0].beginMs;
            cd2id.track[1].lengthMs = cd2id.track[1].endMs –
cd2id.track[1].beginMs;
            cd2id.track[2].lengthMs = cd2id.track[2].endMs –
cd2id.track[2].beginMs;
            cd2id.track[3].lengthMs = cd2id.track[3].endMs –
cd2id.track[3].beginMs;
            cd2id.track[4].lengthMs = cd2id.track[4].endMs –
cd2id.track[4].beginMs;
            cd2id.track[5].lengthMs = cd2id.track[5].endMs –
cd2id.track[5].beginMs;
cd2id.track[6].lengthMs = cd2id.track[6].endMS –
cd2id.track[6].beginMs;
            cd2id.numTracks = 7;
            for(i=1;i<cd2id.numTracks;i++) {
                        printf ("CD #1: Track = %d length inminutes =
%f\n", i, (float)cd2id.track[i].lengthMs/60000.0 );
            }
            printf ("\n");
            cdFromDB.track[0].beginMS = 0;
            cdFromDB.track[1].beginMs = 100001;
            cdFromDB.track[2].beginMs = 231001;
            cdFromDB.track[3].beginMs = 345001;
            cdFromDB.track[4].beginMs = 435001;
            cdFromDB.track[5].beginMs = 460001;
            cdFromDB.track[6].beginMs = 590001;
            cdFromDB.track[0].endMs = 100000;
            cdFromDB.track[1].endMs = 231000;
            cdFromDB.track[2].endMS = 345000;
            cdFromDB.track[3].endMS = 435000;
            cdFromDB.track[4].endMs = 460000;
            cdFromDB.track[5].endMS = 590000;
            cdFromDB.track[6].endMS = 690000;
            cdFromDB.track[0].lengthMS = cd2id.track[0].endMs –
cd2id.track[0].beginMs;
            cdFromDB.track[1].lengthMs = cd2id.track[1].endMs –
cd2id.track[1].beginMs;
            cdFromDB.track[2].lengthMs = cd2id.track[2].endMs –
cd2id.track[2].beginMs;
            cdFromDB.track[3].lengthMs = cd2id.track[3].endMs –
cd2id.track[3].beginMs;
            cdFromDB.track[4].lengthMs = cd2id.track[4].endMs –
cd2id.track[4].beginMs;
            cdFromDB.track[5].lengthMs = cd2id.track[5].endMs –
cd2id.track[5].beginMs;
            cdFromDB.track[6].lengthMs = cd2id.track[6].endMs –
cd2id.track[6].beginMs;
            cdFromDB.numTracks = 7;
            for(i=1 ;i<cdFromDB.numTracks;i++) {
                        printf ("CD #2: Track = %d length inminutes %f\n",
i, (float)cdFromDB.track[i].lengthMs/60000.0 );
            }
            CreateUniqueId( &cd2UID, &cd2id );
            printf( "Unique ID for CD #1 = %d%d\n", cd2UID.id[0],
cd2UID.id[1]);
            CreateUniqueId( &cdFromDBUID, &cdFromDB );
            printf( "Unique ID for CD #2 = %d%d\n", cdFromDBUID.id[0],
cdFromDBUID.id[1] );
            matchtest = (cd2UID.id[0] == cdFromDBUID.id[0]) &&
(cd2UID.id[1] == cdFromDBUID.id[1]);
            printf ("The cd's match if result is non zero matchresult=
%d",matchtest);
            printf ("\n");
            printf ("\n");
            printf ("Test #2 will compare two cd that are nearly the
same\nexcept they have diffent # of tracks \n");
            // put in some test values for the cd track lengths
            // since thes are in ms, its basically 60000 = 1 minute
            cd2id.track[0].beginMs = 0;
            cd2id.track[1].beginMs = 100001;
            cd2id.track[2].beginMs = 231001;
            cd2id.track[3].beginMs = 345001;
            cd2id.track[4].beginMs = 435001;
            cd2id.track[5].beginMs = 460001;
            cd2id.track[6].beginMs = 590001;
            cd2id.track[0].endMs = 100000;
            cd2id.track[1].endMs = 231000;
            cd2id.track[2].endMs = 345000;
            cd2id.track[3].endMS = 435000;
            cd2id.track[4].endMs = 460000;
            cd2id.track[5].endMs = 590000;
            cd2id.track[6].endMs = 690000;
            cd2id.track[0].lengthMs = cd2id.track[0].endMs –
cd2id.track[0].beginMs;
            cd2id.track[1].lengthMs = cd2id.track[1].endMs –
cd2id.track[1].beginMs;
            cd2id.track[2].lengthMs = cd2id.track[2].endMs –
cd2id.track[2].beginMs;
            cd2id.track[3].lengthMs = cd2id.track[3].endMs –
cd2id.track[3].beginMs;
            cd2id.track[4].lengthMs = cd2id.track[4].endMs –
cd2id.track[4].beginMs;
            cd2id.track[5].lengthMs = cd2id.track[5].endMs –
cd2id.track[5].beginMs;
            cd2id.track[6].lengthMs = cd2id.track[6].endMs –
cd2id.track[6].beginMs;
            cd2id.numTracks = 7;
            for(i=1;i<cd2id.numTracks;i++) {
                        printf ("CD #1: Track = %d length inminutes =
%f\n", i, (float) cd2id.track[i].lengthMs/60000.0);
            }
            printf ("\n");
            cdFromDB.track[0].beginMs = 0;
```

APPENDIX B-continued

```
        cdFromDB.track[1].beginMs = 100001;
        cdFromDB.track[2].beginMs = 231001;
        cdFromDB.track[3].beginMs = 345001;
        cdFromDB.track[4].beginMs = 435001;
        cdFromDB.track[5].beginMs = 460001;
        cdFromDB.track[6].beginMs = 590001;
        cdFromDB.track[0].endMs = 100000;
        cdFromDB.track[1].endMs = 231000;
        cdFromDB.track[2].endMs = 345000;
        cdFromDB.track[3].endMs = 435000;
        cdFromDB.track[4].endMs = 460000;
        cdFromDB.track[5].endMs = 590000;
        cdFromDB.track[0].lengthMs = cd2id.track[0].endMs -
cd2id.track[0].beginMs;
        cdFromDB.track[1].lengthMs = cd2id.track[1].endMs -
cd2id.track[1].beginMs;
        cdFromDB.track[2].lengthMs = cd2id.track[2].endMs -
cd2id.track[2].beginMs;
        cdFromDB.track[3].lengthMs = cd2id.track[3].endMs -
cd2id.track[3].beginMs;
        cdFromDB.track[4].lengthMs = cd2id.track[4].endMs -
cd2id.track[4].beginMs;
        cdFromDB.track[5].lengthMs = cd2id.track[5].endMs -
cd2id.track[5].beginMs;
        cdFromDB.numTracks = 6;
        for(i=1;i<cdFromDB.numTracks;i++) {
                printf ("CD #2: Track = %d length inminutes =
%f\n", i, (float)cdFromDB.track[i].lengthMs/60000.0 );
        }
        CreateUniqueId( &cd2UID, &cd2id );
        printf( "Unique ID for CD #1 = %d%d\n", cd2UID.id[0],
cd2UID.id[1] );
        CreateUniqueId( &cdFromDBUID, &cdFromDB );
        printf( "Unique ID for CD #2 = %d%d\n", cdFromDBUID.id[0],
cdFromDBUID.id[1] );
        matchtest = (cd2UID.id[0] == cdFromDBUID.id[0]) &&
(cd2UID.id[1] == cdFromDBUID.id[1]);
        printf ("The cd's match if result is non zero matchresult=
%d",matchtest);
        printf ("\n");
        printf ("\n");
}
```

I claim:

1. A method for associating local and remote data on a local computer connected to a network, the method comprising:

outputting remote data at the local computer based on playback of a recording by the local computer, the remote data obtained via the network from at least one storage location dynamically determined when the playback of the recording occurs using an identifier derived from table of contents information for the recording; and obtaining the remote data using an at least partial pointer corresponding to the recording, the at least partial pointer obtained from the network by the local computer, wherein the remote data is display data representing a World Wide Web page, and wherein the at least partial pointer at least partially defines a uniform resource locator for the World Wide Web page.

2. A method as recited in claim 1, further comprising:

automatically executing a communication program for communication via the network and output of the remote data received from the network, when the recording is played;

determining at a remote computer at least one location, corresponding to the identifier, where the remote data is stored; and automatically sending the remote data from the at least one location to the local computer via the network.

3. A method for associating local and remote data on a local computer connected to a network, the method comprising:

using a processor to automatically execute on the local computer when a recording is played, a communication program for communication via the network to send information related to table of contents information for the recording;

dynamically determining, at a remote computer, at least one location where remote data is stored corresponding to an identifier derived from the information sent from the local computer;

automatically sending the remote data from the at least one location to the local computer via the network; and outputting on the local computer the remote data in association with playback of the recording by the local computer, wherein the communication program is a web browser, the network is the Internet, and the remote data is display data representing at least part of one web page.

4. A method as recited in claim 3, wherein the information used to determine the identifier includes table of contents information for the recording wherein the recording is stored on a disc, and wherein said executing and determining begins when the disc is inserted into a disc drive coupled with the local computer, regardless of whether the communication program has been initiated.

5. A method as recited in claim 1, wherein the remote data includes at least one of an image associated with the recording, animation associated with the recording, and a video associated with the recording.

6. A method as recited in claim 5, wherein the recording is stored on a disc, and wherein the remote data includes display data representing an album cover associated with the disc.

7. A method as recited in claim 1, wherein said outputting outputs the remote data including at least one name of a song included in the recording.

8. A method as recited in claim 1, wherein the recording is on a compact disc containing a plurality of tracks, and wherein said outputting outputs the remote data including at least one title of a corresponding track on the compact disc.

9. A method for associating remote and local data on a local device connected to a network, the method comprising:

deriving an identifier at the local device by numerically processing table of contents information for the recording;

automatically obtaining the remote data from the network by the local device using an at least partial pointer corresponding to the identifier;

outputting at the local device the remote data obtained from the network, based on access to the local data by the local device;

automatically executing a communication program for communication via the network and output of the remote data received from the network, when the local data is accessed; and automatically requesting the remote data based on the identifier, wherein the communication program is a web browser, the network is the Internet, and the remote data is an internet resource.

10. A method as recited in claim 9, further comprising obtaining the remote data using at least one uniform resource locator corresponding to the identifier and based on the at least partial pointer obtained from the network by the local device.

11. A method as recited in claim 10, wherein the remote data is an Internet resource.

12. A method as recited in claim 9, wherein the remote data include an electronic file of digitally encoded audio.

13. A method as recited in claim 9, wherein the remote data include at least one of an image associated with the local data, animation associated with the local data, and a video associated with the local data.

14. A method as recited in claim 13, wherein the local data is an electronic file of digitally encoded audio, and
wherein the remote data include an album cover associated with the electronic file.

15. A method for associating remote and local data stored in a recording accessed by a local device connected to a network, the method comprising:
using a processor to automatically execute a program on the local device, when the local data are accessed to play the recording for a user of the local device, to obtain at least one pointer string, corresponding to the local data, from at least one database of local data identifiers derived from the local data and pointer strings stored on at least one remote device connected to the local device via the network;
obtaining the remote data via the network from a content provider based on the at least one pointer string;
outputting at the local device the remote data obtained from the network; and
maintaining in the at least one database an association between the local data identifiers and the pointer strings which at least partially define uniform resource locators of corresponding Internet resources for a plurality of items of local data provided by an organization,
wherein the recording is digital audio and the items of local data are electronic files of digital audio; and
wherein the at least one pointer string at least partially defines an address of a World Wide Web page maintained on behalf of at least one person who produced sound for the recording.

16. A method as recited in claim 15, wherein the remote data include at least one of an image of the at least one person, a video in which the at least one person appears and biographical information about the at least one person.

17. A method as recited in claim 15, wherein the remote data include an electronic file of digital audio.

18. A method as recited in claim 15, wherein the remote data include an electronic file of digital audio.

19. A system coupled to a network and associating remote data with local data included in a recording to play back the recording, the system comprising:
a local device located at a first location, including
an access unit playing the recording for a user of the local device and accessing the local data;
a communication unit, coupled to said access unit, automatically obtaining, upon access to the local data by said access unit, the remote data from m. the network using at least one pointer string at least partially defining uniform resource locator corresponding to the local data; and
an output unit, coupled to said communication unit at the first location, outputting the remote data; and
a remote computer, coupled to said communication unit via the network and located at a second location remote from the first location, storing at least one database of recording identifiers and pointer strings, said communication unit obtaining the at least one pointer string from said remote computer, wherein the at least one database stored on said remote computer associates the recording identifiers with at least partial uniform resource locators of corresponding World Wide Web pages for a plurality of recordings released by an organization.

20. A system as recited in claim 19,
wherein said communication unit in said local device further sends to said remote computer information provided with the recording to play back the recording, and
wherein said remote computer determines, based on the information received from said local device, a recording identifier for the recording corresponding to the at least one pointer string.

21. A system as recited in claim 19,
wherein said local device further includes a processor generating a recording identifier for the recording based on information used to play back the recording, and
wherein said communication unit sends the recording identifier to the remote computer to obtain the at least one pointer string.

22. A system coupled to a network and associating remote data with local data included in a recording to play back the recording, the system comprising:
a local device located at a first location, including
an access unit playing the recording for a user of the local device and accessing the local data;
a communication unit, coupled to said access unit, automatically obtaining, upon access to the local data by said access unit, the remote data from the network using at least one pointer string at least partially defining uniform resource locator corresponding to the local data; and
an output unit, coupled to said communication unit at the first location, outputting the remote data; and
a remote computer, coupled to said communication unit via the network and located at a second location remote from the first location, storing at least one database of recording identifiers and pointer strings, said communication unit obtaining the at least one pointer string from said remote computer, wherein the at least one pointer string at least partially addresses a World Wide Web page maintained on behalf of at least one person who produced sound for the recording.

* * * * *

UNITED STATES PATENT AND TRADEMARK OFFICE
CERTIFICATE OF CORRECTION

| | | |
|---|---|---|
| PATENT NO. | : 7,680,902 B2 | Page 1 of 1 |
| APPLICATION NO. | : 11/841784 | |
| DATED | : March 16, 2010 | |
| INVENTOR(S) | : Dale T. Roberts and Ann E. Greenberg | |

Figure 2:
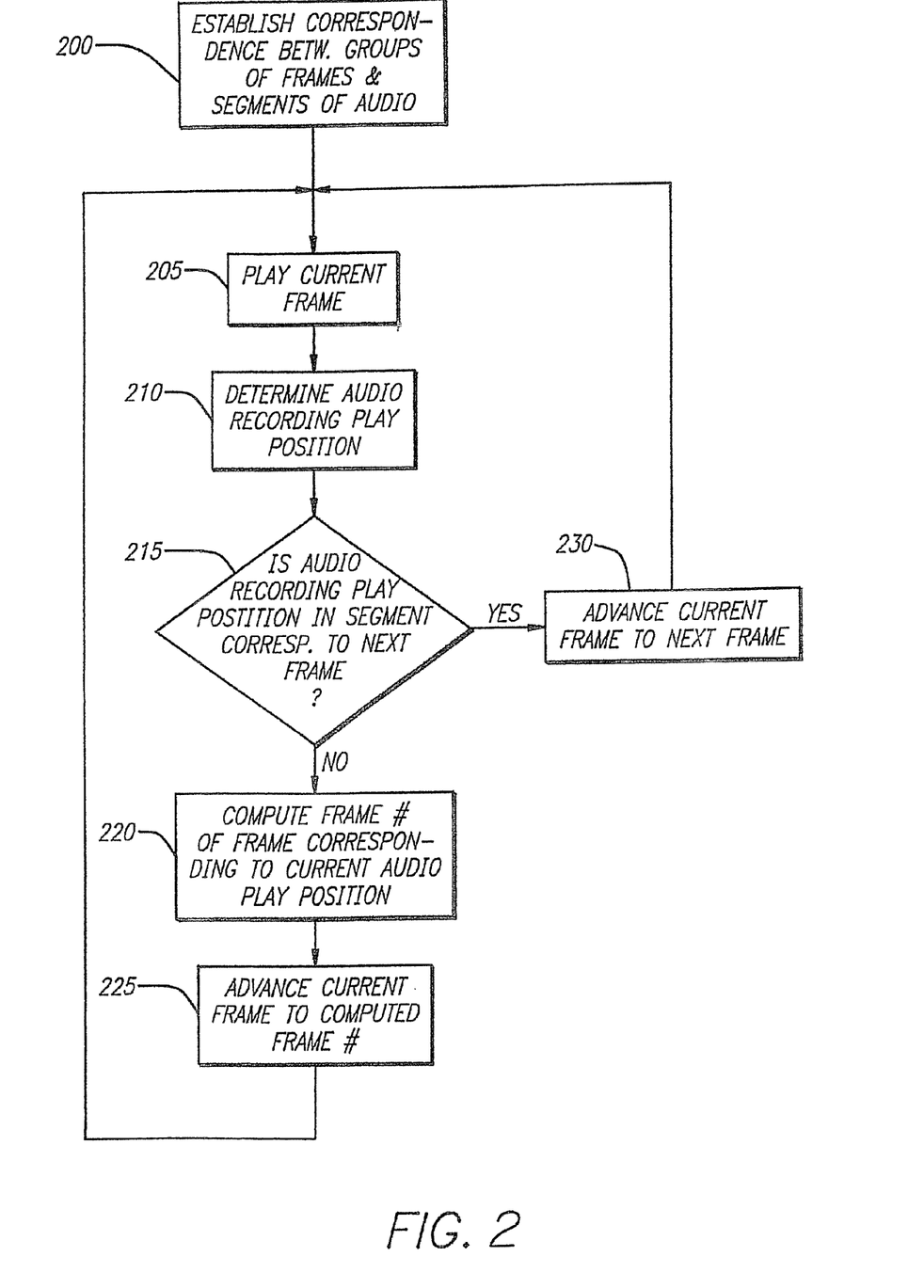
FIG. 2 is a flowchart of the synchronization code.

It is certified that error appears in the above-identified patent and that said Letters Patent is hereby corrected as shown below:

In Sheet 2 of 3, Reference Numeral 215, in Figure 2, line 3, delete "POSTITION" and insert -- POSITION --, therefor.

In column 3, line 23, delete "Corner," and insert -- Comer, --, therefor.

In column 7, line 65, delete "aspect" and insert -- aspect, --, therefor.

In column 9, line 56, delete "diffent" and insert -- different --, therefor.

In column 10, line 32, delete "Ms\60000.0" and insert -- Ms/60000.0 --, therefor.

In column 10, line 35, delete "234565," and insert -- 234565; --, therefor.

In column 11, line 35, delete "thes" and insert -- these --, therefor.

In column 12, line 36, delete "diffent" and insert -- different --, therefor.

In column 12, line 38, delete "thes" and insert -- these --, therefor.

In column 14, line 60, in Claim 9, delete "internet" and insert -- Internet --, therefor.

In column 15, line 53, in Claim 19, after "data from" delete "m.".

Signed and Sealed this

Eighteenth Day of May, 2010

David J. Kappos
*Director of the United States Patent and Trademark Office*